United States Patent
Silberman et al.

(10) Patent No.: US 10,802,829 B2
(45) Date of Patent: *Oct. 13, 2020

(54) SCALABLE DEPENDENCY MATRIX WITH WAKE-UP COLUMNS FOR LONG LATENCY INSTRUCTIONS IN AN OUT-OF-ORDER PROCESSOR

(71) Applicant: International Business Machines Corporation, Armonk, NY (US)

(72) Inventors: Joel A. Silberman, Somers, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/826,742

(22) Filed: Nov. 30, 2017

(65) Prior Publication Data

US 2019/0163483 A1    May 30, 2019

(51) Int. Cl.
*G06F 9/38*    (2018.01)

(52) U.S. Cl.
CPC .......... *G06F 9/3838* (2013.01); *G06F 9/3851* (2013.01)

(58) Field of Classification Search
CPC .................................................. G06F 9/3838
See application file for complete search history.

(56) References Cited

U.S. PATENT DOCUMENTS 5,655,096 A * 8/1997 Branigin ............... G06F 9/3836
                                                          712/200
5,710,902 A    1/1998 Sheaffer et al.
(Continued)

FOREIGN PATENT DOCUMENTS

CN    101034345 A    9/2007
CN    102360309 A    2/2012

OTHER PUBLICATIONS

Joel A. Silberman, et al., Pending U.S. Appl. No. 15/826,734 entitled "Scalable Dependency Matrix With a Single Summary Bit in an Out-Of-Order Processor," filed with the U.S. Patent and Trademark Office on Nov. 30, 2017.

(Continued)

*Primary Examiner* — Aimee Li
*Assistant Examiner* — William V Nguyen
(74) *Attorney, Agent, or Firm* — Cantor Colburn LLP; Jason Sosa (57) ABSTRACT

Aspects of the invention include tracking dependencies between instructions in an issue queue. The tracking includes, for each instruction in the issue queue, tracking a specific dependency on each of a threshold number of instructions most recently added to the issue queue prior to the instruction, tracking as a single group a dependency of the instruction on any instructions in the issue queue that are not in the threshold number of instructions, and tracking for each source register used by the instruction an indicator of whether its content is dependent on results from an instruction in the single group that has not finished execution. Based at least in part on detecting removal from the issue queue of an instruction in the single group that has issued and not finished execution, the method includes indicating that the instruction is ready for issuance or waiting for a (Continued)

notification that the removed instruction has finished execution.

18 Claims, 7 Drawing Sheets

(56) References Cited

U.S. PATENT DOCUMENTS

| | | | |
|---|---|---|---|
| 6,065,105 | A | 5/2000 | Zaidi |
| 6,336,183 | B1 | 1/2002 | Le et al. |
| 6,425,074 | B1 | 7/2002 | Meier et al. |
| 6,463,523 | B1 | 10/2002 | Kessler et al. |
| 6,553,480 | B1 | 4/2003 | Cheong |
| 6,557,095 | B1 | 4/2003 | Henstrom |
| 6,728,866 | B1 | 4/2004 | Kahle et al. |
| RE38,599 | E | 9/2004 | Tremblay |
| 6,931,639 | B1 | 8/2005 | Eickemeyer |
| 6,988,183 | B1* | 1/2006 | Wong ................. G06F 9/30174 712/208 |
| 6,988,186 | B2 | 1/2006 | Eickemeyer et al. |
| 7,133,925 | B2 | 11/2006 | Mukherjee et al. |
| 7,219,249 | B1 | 5/2007 | Ghose |
| 7,464,253 | B2 | 12/2008 | Veidenbaum et al. |
| 7,472,258 | B2 | 12/2008 | Burky |
| 7,689,812 | B2 | 3/2010 | Abernathy et al. |
| 8,127,116 | B2 | 2/2012 | Islam et al. |
| 8,285,974 | B2 | 10/2012 | Singh et al. |
| 8,392,672 | B1 | 3/2013 | Rhoades et al. |
| 8,521,998 | B2 | 8/2013 | Albernathy et al. |
| 8,667,260 | B2 | 3/2014 | Eichenberger et al. |
| 8,930,432 | B2 | 1/2015 | Hickey et al. |
| 9,047,079 | B2 | 6/2015 | Bruce et al. |
| 9,058,180 | B2 | 6/2015 | Golla et al. |
| 9,146,774 | B2 | 9/2015 | Busaba et al. |
| 9,158,573 | B2 | 10/2015 | Busaba et al. |
| 9,298,466 | B2 | 3/2016 | Buyuktosunoglu et al. |
| 9,489,207 | B2 | 11/2016 | Burky et al. |
| 9,513,924 | B2 | 12/2016 | Gschwind et al. |
| 9,619,383 | B2 | 4/2017 | Busaba et al. |
| 2002/0053038 | A1 | 5/2002 | Buyukosunoglu et al. |
| 2003/0069920 | A1 | 4/2003 | Melvin et al. |
| 2004/0177239 | A1 | 9/2004 | Clift et al. |
| 2004/0215938 | A1 | 10/2004 | Burky |
| 2005/0038979 | A1 | 2/2005 | Fischer et al. |
| 2005/0243734 | A1 | 11/2005 | Nemirovsky et al. |
| 2006/0095732 | A1 | 5/2006 | Tran |
| 2009/0100249 | A1 | 4/2009 | Eichenberger et al. |
| 2009/0113181 | A1 | 4/2009 | Comparan et al. |
| 2009/0276608 | A1 | 11/2009 | Shimada |
| 2010/0095087 | A1 | 4/2010 | Eichenberger et al. |
| 2010/0161942 | A1 | 6/2010 | Bishop |
| 2010/0262806 | A1 | 10/2010 | Doing |
| 2011/0153986 | A1 | 6/2011 | Alexander et al. |
| 2011/0302392 | A1 | 12/2011 | Abernathy et al. |
| 2012/0233441 | A1 | 9/2012 | Barreh |
| 2013/0205118 | A1 | 8/2013 | Buyuktosunoglu et al. |
| 2014/0351562 | A1 | 11/2014 | Spadini |
| 2015/0106595 | A1 | 4/2015 | Khot et al. |
| 2015/0220342 | A1 | 8/2015 | Glossner |
| 2016/0117172 | A1 | 4/2016 | Alexander et al. |
| 2016/0202988 | A1 | 7/2016 | Ayub et al. |
| 2017/0132010 | A1 | 5/2017 | Vasekin et al. |
| 2017/0235577 | A1* | 8/2017 | Brownscheidle ..... G06F 9/3836 712/214 |
| 2017/0344374 | A1 | 11/2017 | Friedmann |
| 2018/0232234 | A1 | 8/2018 | Alexander |
| 2019/0163482 | A1 | 5/2019 | Silberman |
| 2019/0163483 | A1 | 5/2019 | Silberman |
| 2019/0163484 | A1 | 5/2019 | Silberman |
| 2019/0163485 | A1 | 5/2019 | Karve |
| 2019/0163486 | A1 | 5/2019 | Sinharoy |
| 2019/0163488 | A1 | 5/2019 | Karve |
| 2019/0163489 | A1 | 5/2019 | Karve |
| 2019/0163490 | A1 | 5/2019 | Silberman |
| 2019/0163491 | A1 | 5/2019 | Silberman |

OTHER PUBLICATIONS

Joel A. Silberman, et al., Pending U.S. Appl. No. 15/826,746 entitled "Scalable Dependency Matrix With Multiple Summary Bits in an Out-Of-Order Processor," filed with the U.S. Patent and Trademark Office on Nov. 30, 2017.

Joel A. Silberman, et al., Pending U.S. Appl. No. 15/826,754 entitled "Completing Coalesced Global Completion Table Entries in an Out-Of-Order Processor," filed with the U.S. Patent and Trademark Office on Nov. 30, 2017.

Joel A. Silberman, et al.., Pending U.S. Appl. No. 15/826,752 entitled "Coalescing Global Completion Table Entries in an Out-Of-Order Processor," filed with the U.S. Patent and Trademark Office on Nov. 30, 2017.

List of IBM Patents or Patent Applictions Treated as Related; (Appendix P), Filed Nov. 30, 2017.

Mohit Karve, et al., Pending U.S. Appl. No. 15/826,738 entitled "Head and Tail Pointer Manipulation in a First-In-First-Out Issue Queue," filed with the U.S. Patent and Trademark Office on Nov. 30, 2017.

Mohit S. Karve, et al., Pending U.S. Appl. No. 15/826,740 entitled "Block Based Allocation and Deallocation of Issue Queue Entries," filed with the U.S. Patent and Trademark Office on Nov. 30, 2017.

Ramírez et al., "Direct Instruction Wakeup for Out-Of-Order Processors," Proc Innovative Architecture for Future Generation High-Performance Processors and Systems, IEEE, 2004, 8 Pages.

Subramaniam et al., "Store Vectors for Scalable Memory Dependence Prediction and Scheduling," Proc of the 12th Intl Symp on High-Performance Computer Architecture, IEEE, 2006, 12 pages.

U.S. Appl. No. 15/826,741, filed Nov. 30, 2017, Entitled: Buffered Instruction Dispatching to an Issue Queue, First Named Inventor: Mohit S. Karve.

U.S. Appl. No. 15/826,745, filed Nov. 30, 2017, Entitled: Issue Queue With Dynamic Shifting Between Ports, First Named Inventor: Balaram Sinharoy.

Akkary et al., "Checkpoint processing and recovery: Towards scalable large instruction window processors." Microarchitecture, 2003. MICRO-36. Proceedings. 36th Annual IEEE/ACM International Symposium on. IEEE, 2003, 12 pages.

Alastruey et al. "Selection of the Register File Size and the Resource Allocation Policy on SMT Processors." Computer Architecture and High Performance Computing, 2008. SBAC-PAD'08. 20th International Symposium on. IEEE, 2008, 8 pages.

Anonymously; "An extensible, scalable, optimized multithreaded data loading framework for software applications"; http://ip.com/IPCOM/000240374D; Jan. 28, 2015, 8 pages.

Anonymously; "Method and Apparatus for Hardware Assisted Function Shipping"; http://ip.com/IPCOM/000199436D; Sep. 3, 2010, 7 pages.

Anonymously; "System of Programmable Mode Control within an Instruction Sequencing Unit for Management of Power within a Microprocessor"; http://ip.com/IPCOM/000217762D; May 11, 2012, 2 pages.

Anonymously; "VSU/FXU Powergating"; http://ip.com/IPCOM/000216899D; Apr. 23, 2012, 2 pages.

Daniele Folegnani et al., "Energy Effective Issue Logic" ISCA '01, Proceedings of the 28th annual international symposium on Computer architechture, pp. 230-239 (Year:2001).

Duong et al., "Compiler Assisted Out-Of-Order Instruction Commit." Center for Embedded Computer Systems, University of California, Irvine (2010), 27 pages.

Ergin et al. "Increasing processor performance through early register release." Computer Design: VLSI in Computers and Processors, 2004. ICCD 2004. Proceedings. IEEE International Conference on. IEEE, 2004, 8 pages.

Herlihy et al., . Transactional memory: Architectural support for lock-free data structures. vol. 21. No. 2. ACM, 1993, 41 pages.

International Search Report and Written Opinion for International Application No. PCT/IB2018/058800; International Filing Date: Nov. 9, 2018; dated Feb. 27, 2019, 9 pages.

(56) References Cited

OTHER PUBLICATIONS

International Search Report and Written Opinion for International Application No. PCT/IB2018/058801, International Filing Date: Nov. 9, 2018; dated Jan. 21, 2019, 9 pages.
International Search Report/Written Opinion for International Application No. PCT/IB2018/058799, International Filing Date: Nov. 9, 2018; dated Feb. 12, 2019, 9 pages.
Koufaty et al., "Hyperthreading technology in the netburst microarchitecture." IEEE Micro 23.2 (2003): pp. 56-65.
Martinez et al. "Cherry: Checkpointed early resource recycling in out-of-order microprocessors." Microarchitecture, 2002.(MICRO-35). Proceedings. 35th Annual IEEE/ACM International Symposium on. IEEE, 2002, 12 pages.
Mericas, A.; "Performance Characteristics of the POWER8 Processor"; IBM Corporation, IBM Systems & Technology Group Development; 2014, 26 pages.
Shum et al., "IBM zEC12: The third-generation high-frequency mainframe microprocessor." IEEE Micro 33.2 (2013): pp. 38-47.
Tendler, JM. et al.; "POWER4 System microarchitecture"; IBM Corporation, IBM Research & Development; vol. 46, No. 1; Jan. 2002, 21 pages.
Joel A. Silberman, et al.., Pending U.S. Appl. No. 16/738,360 entitled "Coalescing Global Completion Table Entries in an Out-Of-Order Processor," filed with the U.S. Patent and Trademark Office on Jan. 9, 2020.

* cited by examiner

SCALABLE DEPENDENCY MATRIX WITH WAKE-UP COLUMNS FOR LONG LATENCY INSTRUCTIONS IN AN OUT-OF-ORDER PROCESSOR

BACKGROUND

Embodiments of the present invention relate in general to an out-of-order (OoO) processor and more specifically to a scalable dependency matrix with wake-up columns for long latency instructions in an issue queue of an OoO processor.

In an OoO processor, an instruction sequencing unit (ISU) dispatches instructions to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues.

The ISU includes one or more issue queues that contain dependency matrices for tracking dependencies between instructions. A dependency matrix typically includes one row and one column for each instruction in the issue queue. As the number of instructions in the issue queues continues to increase, the amount of space and power taken up by each of the dependency matrices is growing.

SUMMARY

Embodiments of the present invention include methods, systems, and computer program products for implementing a scalable dependency matrix with wake-up columns for long latency instructions in an issue queue of an out-of-order (OoO) processor. A non-limiting example method includes tracking dependencies between instructions in an issue queue. The tracking includes, for each instruction in the issue queue, tracking a specific dependency on each of a threshold number of instructions most recently added to the issue queue prior to the instruction, and tracking as a single group a dependency of the instruction on any instructions in the issue queue that are not in the threshold number of instructions. The tracking further includes, for each instruction in the issue queue and for each source register used by the instruction, an indicator of whether its content is dependent on results from an instruction in the single group that has not finished execution. Based at least in part on detecting removal from the issue queue of an instruction in the single group that has issued and not finished, the method includes indicating that the instruction is ready for issuance based at least in part on the instruction not having a source register with contents that are dependent on results from the removed instruction, and waiting for a notification that the removed instruction has finished before indicating that the instruction is ready for issuance based at least in part on the instruction having a source register with contents that are dependent on results from the removed instruction.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

In accordance with one or more embodiments of the present invention, a scalable dependency matrix that includes one or more summary bits and wake-up columns is provided to prevent long latency instructions from holding up the issuance of other instructions in an issue queue of an instruction sequencing unit (ISU) of an out-of-order (OoO).

As mentioned above, the number of instructions stored in contemporary issue queues continues to increase. Contemporary issue queues include dependency matrices that grow as the square of the number of instructions, and at some point the ever expanding size of the dependency matrices are likely to have an impact on timing. One or more embodiments of the present invention described herein provide a reduced sized dependency matrix in an issue queue of an instruction sequencing unit (ISU) of an out-of-order (OoO) processor. The reduction in size is based on the recognition that dependencies typically exist between instructions that are added to the issue queue within a close timeframe of each other. Dependencies of an instruction on instructions that are within the close timeframe of the instruction being added to the issue queue are tracked individually in accordance with one or more embodiments of the present invention. Dependencies of the instruction on instructions that are outside of the close timeframe of the instruction being added to the issue queue are tracked as a single group using a summary bit in accordance with one or more embodiments of the present invention.

In accordance with one or more embodiments of the present invention, for a processor running in a single-thread (ST) mode with an issue queue that holds sixty-four instructions (N=64), the dependency of an instruction on the previous thirty-two instructions (N/2) can be tracked with specificity (e.g., identifying exact instruction(s)) in the issue queue. A summary bit can be used to indicate that the instruction is dependent on any instruction further back than N/2. An entry (instruction) in the dependency matrix of the issue queue with the summary bit set has to wait until the oldest N/2 entries are cleared before indicating that the instruction is ready to be issued. This combination of precise tracking (N/2 back) and imprecise tracking (summary bit further than N/2 back) along with implementing the issue queue as a first-in-first-out (FIFO) queue allows the dependency matrix to be scalable and logically implemented as a trapezoid which can be physically stored in a manner to save storage space. In addition, implementing the issue queue as a FIFO queue saves additional storage space by eliminating the need for an age array to be included in the issue queue. In accordance with one or more embodiments of the present invention, when the processor is executing in a simultaneous multi-threading (SMT) mode, the summary bit is not utilized and the amount of precise tracking remains the same as contemporary implementations that track all of the N/2−1 previous instructions belonging to a given thread. This is because in SMT mode(s), each thread can be forced to only use one half of the issue queue without any noticeable loss of SMT performance and within each half, this mechanism allow precise tracking of the N/2−1 previous instructions.

When using a summary bit to track the dependency of a younger instruction on a group of older instructions, a single long running instruction in the group can keep the summary bit set to "1", thus keeping the younger instruction from being issued and executed. The issuance of the younger instruction can be delayed even when the younger instruction is not dependent on the long running instruction. Because the older instructions are tracked as a group, an younger instruction that is dependent on the finish of any instruction in the group for issuance cannot be issued until all of the instructions in the group have finished (and not just the instruction in the group that the instruction depends on). Finish of all instructions in the group can be indicated by changing the value of the summary bit associated with an instruction to indicate finish (e.g., from a "1" to a "0"). In accordance with one or more embodiments of the present invention described herein, the delay to the whole group caused by a long running instruction can be avoided by removing the long running instruction from the group. Once the long running instruction is removed, the value of the summary bit associated with the instruction can be changed to indicate that the group has finished execution as long as the instruction does not depend on contents written to a target register by the long running instruction. The instruction can be marked as ready to issue as long as the instruction is not dependent on any of the remaining instructions in the group and all other dependencies are satisfied (e.g., the instruction is not dependent on another instruction that is younger than the instructions in the group. For such instructions the dependency is tracked with specificity).

In accordance with one or more embodiments, when an instruction is added to the issue queue, one or more summary bits and source register bits (also referred to herein as "wake-up columns") corresponding to the instruction are also generated. A source register bit can be set to "0" to indicate that the instruction writing to the corresponding source register is not in the issue queue (e.g., it already finished execution) or when the instruction writing to the corresponding source register is one of the instructions being tracked with specificity. A source register bit can be set to "1" to indicate that the instruction writing to the corresponding source register is one of the instructions in the group of instructions being tracked by the summary bit. In accordance with one or more embodiments described herein, the target register(s) of the long running instruction is compared to the source register(s) of the instruction in order to determine if there is a dependency.

The long running instruction can be the oldest instruction in the group, that is, the instruction that has been in the issue queue the longest. Alternatively, or in addition, the long running instruction can also be an instruction that has not finished execution within a threshold amount of time of its issuance. Alternatively, or in addition, the long running instruction can also be a specific type of instruction, such as, but not limited to, a load from memory instruction that writes results to a target register(s). Loads that miss local caches can take relatively long time to finish and a very common example (there are other examples of long running instructions as well, such as floating-point divide and square root operations). The instruction removed from the issue queue is tracked separately (e.g., by the ISU) and when it finishes execution, a broadcast message can be sent to all instructions in the issue queue to indicate that results are available in the target register(s). Any instruction(s) in the issue queue having a source register(s) corresponding to the target register(s) can be updated to indicate that the dependency has been satisfied.

Removing the long running instruction from the issue queue prevents a single long running instruction in a group of instructions from holding up a possibly large number of instructions in an IQ that are not dependent on the long running instruction but instead depend on one or more other instructions in the group that have already finished execution. This can improve the latency when a summary bit(s) is used to track dependencies on a group(s) of older instructions.

In accordance with one or more embodiments of the present invention, the group of instructions that are outside of the close timeframe of the instruction being added to the issue queue (i.e., those instructions not being tracked with specificity) are broken down into one or more sub-groups which are each tracked with their own separate summary bits. In these embodiments, multiple summary bits are utilized to track dependencies of an instruction on instructions in the multiple groups of instructions (i.e., each summary bit indicates dependency on an instruction from a particular group of instructions). For example, with two summary bits, a given instruction can be tracked separately to be dependent on an instruction from the oldest quadrant (from entries N to N/4−1) or the second oldest quadrant (from entries N/4 to N/2−1) in the issue queue. If the instruction is only dependent on an instruction from the second oldest quadrant and all the instructions in that quadrant has finished execution, then the instruction can be issued without having to wait for the instructions in the first quadrant to finish execution.

In accordance with one or more embodiments of the present invention, the number of previous instructions being tracked with specificity is selectable/programmable and not limited to the N/2 previous instructions.

Figure 1:
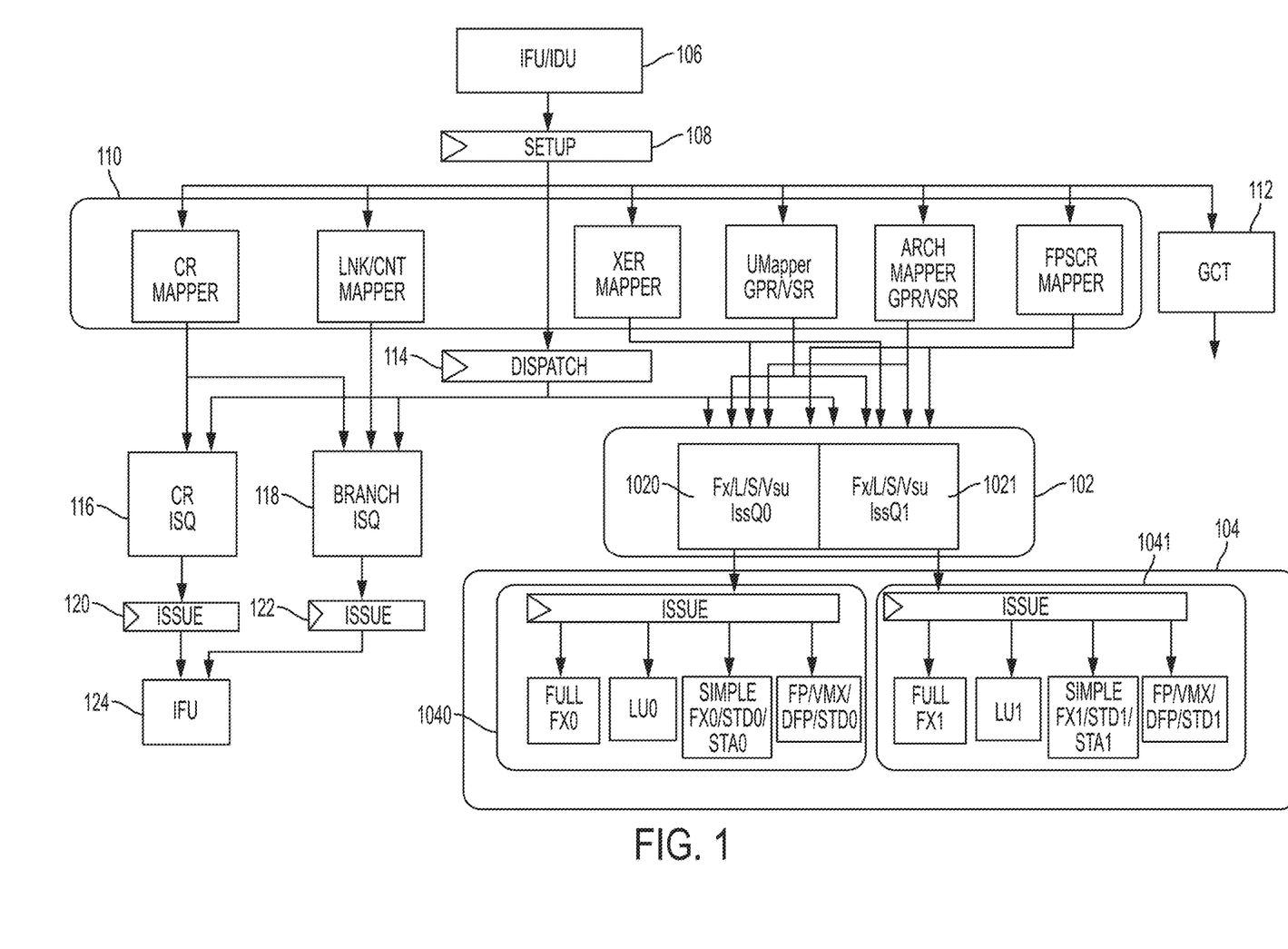
FIG. 1 depicts a block diagram of a system that includes an instruction sequencing unit (ISU) of an out-of-order (OoO) processor for implementing a scalable dependency matrix with wake-up columns in an issue queue accordance with one or more embodiments of the present invention.

Turning now to FIG. 1, a block diagram of a system that includes an instruction sequencing unit (ISU) of an out-of-order (OoO) processor for implementing a scalable dependency matrix with a summary bit and a wake-up column in an issue queue is generally shown according to one or more embodiments of the present invention. The system shown in FIG. 1 includes an instruction fetch unit/instruction decode unit (IFU/IDU) 106 that fetches and decodes instructions for input to a setup block 108 which prepares the decoded instructions for input to a mapper 110 of the ISU. In accordance with one or more embodiments, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed point instructions (Fx), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in ST mode, the issue queue 102 can be used as a single logical issue queue that contains both ISQ0 1020 and ISQ1 1021 to process all of the instructions (in this example all N instructions) of a single thread.

When the processor is executing in SMT mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). As shown in FIG. 1, when the processor is executing in ST mode, the first group of execution units 1040 execute instructions issued from ISQ0 1020 and the second group of execution units 1041 execute instructions issued from ISQ1 1021. In alternate embodiments when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments, when the processor is executing in SMT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
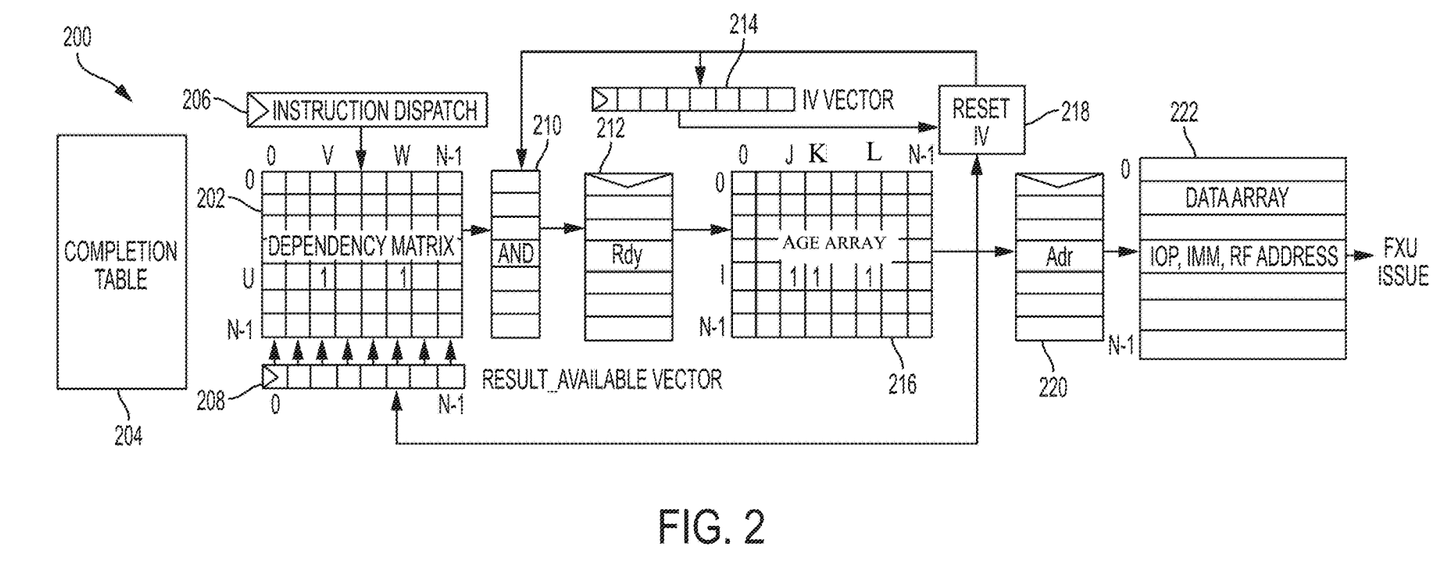
FIG. 2 depicts a block diagram of an issue queue in an ISU of an OoO processor in accordance with one or more embodiments of the present invention.

Turning now to FIG. 2, a block diagram of an issue queue 200 is generally shown according to one or more embodiments of the present invention. The issue queue 200 shown in FIG. 2 includes matrices, tables, and vectors for tracking instructions that are waiting to be issued. The matrices and tables each include a corresponding row for each instruction being tracked, and the vectors include an entry for instructions being tracked. As the number of instructions in the issue queues continues to increase, the amount of space and power taken up by each of the matrices, tables, and vectors is growing. Embodiments of the present invention described herein can be used to reduce the size of a dependency matrix 202 in the issue queue 200 by using a summary bit for tracking dependencies on older instructions. In addition, by storing instructions in the order received into the issue queue 200, the age array 216 can be eliminated from the issue queue 200.

The issue queue 200 tracks instructions that are waiting for execution by an execution unit. An instruction is dispatched and allocated to the issue queue 200 (e.g., CR ISQ 116, Branch ISQ 118, issue queue 102). The instruction is ready to issue from the issue queue 200 when its dependencies are satisfied, that is when the instructions have issued and their corresponding results are available. The issue queue 200 issues the instruction to an execution unit (e.g., execution unit 104). After issuing the instruction, the issue queue 200 continues to track the instruction at least until the instruction passes a rejection point. The rejection point is different for different instructions and refers to the point where it is known that the instruction will not have to be reissued (e.g., in a read memory operation the rejection point can be passed once the cache is accessed for the read data). Once the instruction has passed the rejection point it can be deallocated from the issue queue and the entry in the issue queue is cleared for reuse by a new instruction. The instruction finishes once the execution of the instruction, by an execution unit, finishes and result data is obtained (as needed by the instruction).

The issue queue 200 shown in FIG. 2 includes: a dependency matrix 202 for tracking dependencies between instructions in the issue queue 200; a completion table 204 for indicating that the execution of an instruction has passed the rejection point and the instruction can be deallocated from the issue queue 200; an instruction dispatch unit 206 (e.g., dispatch unit 114 in FIG. 1) for receiving instructions to add to the issue queue; a result-available vector 208 for indicating that all of the instructions that the instruction is dependent on have issued; an IV vector 214 that indicates the instructions that are valid and issuable; AND logic 210 that logically ANDs the output of the dependency matrix with the IV vector; a ready vector 212 for indicting that the results from all of the instructions that the instruction is dependent on are available and the instruction is valid and issuable; an age array 216 for tracking the order that the instructions came into the issue queue so that when two or more instructions are ready for execution, older instruction can be selected before newer instruction; a reset IV control 218 for updating the IV state to prevent re-issue of a selected instruction or permit re-issue after rejection; an address 220 used as a read index corresponding to the instruction selected for issue; and a data array 222 containing the text of the instruction that is used by the execution unit for executing the instruction (e.g., an opcode, a pointer to a register file address, immediate data).

As shown in the dependency matrix 202 of FIG. 2 which can track N instructions that are waiting in the issue queue, an instruction at position "u" depends on the instructions at position "v" and "w". The dependency matrix 202 shown in FIG. 2 has N rows and N columns, one row and column for each instruction in the issue queue. As shown in the age array 216 of FIG. 2, instructions at positions "j", "k", and "l" are older than the instruction at position "i".

Figure 3:
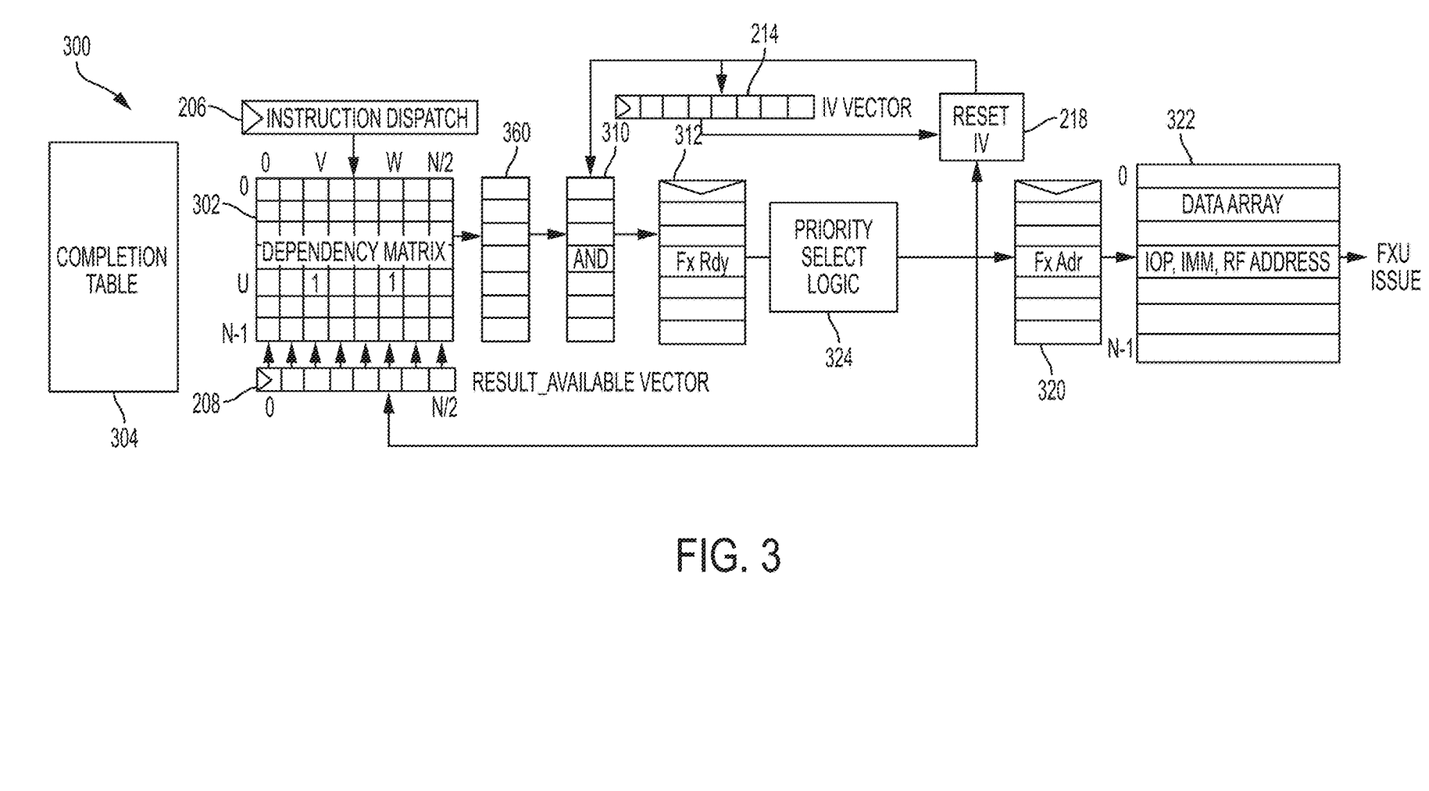
FIG. 3 depicts a block diagram of an issue queue in an ISU of an OoO processor for implementing a scalable dependency matrix with wake-up columns in accordance with one or more embodiments of the present invention.
Figure 4:
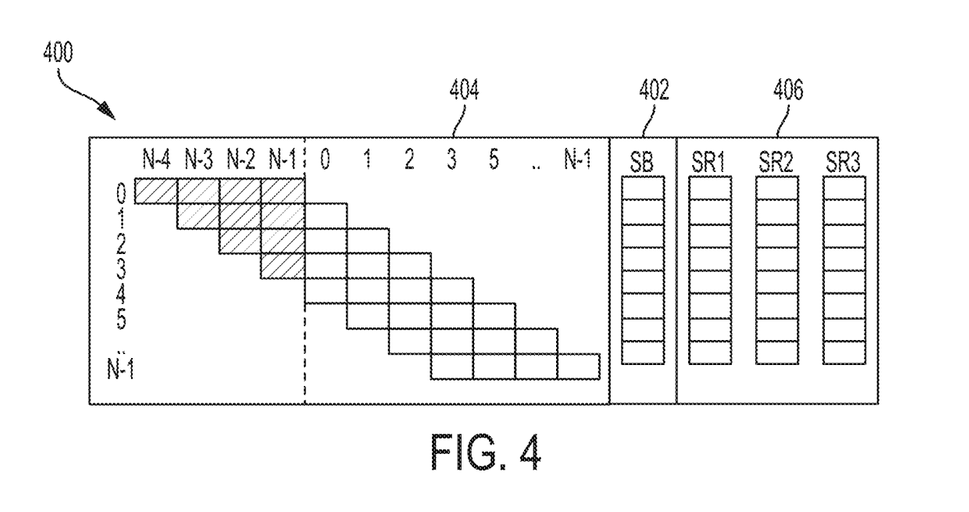
FIG. 4 depicts a block diagram of a logical view of a scalable dependency matrix with wake-up columns in accordance with one or more embodiments of the present invention.

Turning now to FIG. 3, a block diagram of an issue queue 300 in an ISU of an OoO for implementing a scalable dependency matrix with a summary bit and wake-up column (or source register bit) portion 360 is generally shown in accordance with one or more embodiments of the present invention. The issue queue 300 shown in FIG. 3 is similar to the issue queue 200 described above with reference to FIG. 2 except that the instructions are inserted into the matrices, tables, and vectors in FIFO order and there is no need for the logic or circuitry associated with the age array 216 shown in FIG. 2 because the instructions are inserted into the matrices, tables, and vectors in the order that they were received. In place of the age array 216 of FIG. 2, the issue queue 300 shown in FIG. 3 includes priority select logic 324 for selecting between two or more ready instructions based on their relative positions in the issue queue 200. Thus, the dependency matrix 302, completion table 304, AND vector 310, ready vector 312, address 320, and data array 322 contain corresponding entries that are in the order that they were received from the instruction dispatch unit 206. In addition, a summary bit portion 360 is provided for each entry in the dependency matrix 302 to track dependencies on older instructions. The summary bit and wake-up column portion 360 can include one or more summary bits and one or more wake-up columns. In accordance with one or more embodiments of the present invention, in an architecture where an instruction in the issue queue can have a maximum of three source registers, the maximum number of wake-up columns is three.

In accordance with one or more embodiments of the present invention, an oldest instruction can be identified based, for example, by a position of a head pointer in the FIFO issue queue. The oldest instruction can be selected for removal. An additional check can be made prior to selection to determine whether the oldest instruction is a long latency type of instruction (e.g., a load from memory that missed all local caches and hence will take a long time to get the data from main memory or from a remote cache). If the oldest instruction is a long latency type of instruction that has passed the point of rejection, then the instruction can be selected for removal from the issue queue and the issue dependency of all the younger instructions on the finish of this long latency instruction can be tracked separately using the wake-up columns. When the long latency instruction finishes execution and writes its target register, the target register is compared with the source registers of the younger instructions and if there is a match then the corresponding bit in the wake-up column is set to "0", to indicate that the younger instruction no longer has to wait for the long latency instruction to finish execution. When the summary bit(s) and wake-up bit(s) of a given instruction is set to "0", the instruction can be marked as ready to issue as long as all other dependencies are satisfied (e.g., the instruction is not dependent on other instructions for which the dependency is tracked with specificity). Once the long running instruction is removed from the issue queue, it still needs to be determined if any of the remaining instructions in the issue queue are dependent on it or not. This is done based on the wake-up bit in the wake-up column (e.g., one bit in the column for each instruction). When the long running instruction finishes, the wake-up bit is turned off for the younger instructions that is dependent on the long running instruction, which allows the younger instructions to be tracked as no longer being dependent on the long running instruction. Structure 360 is expanded in FIG. 4 with one SB column (summary bit) and three wake-up columns: SR1, SR2 and SR3 (for three source registers). In an embodiment, the three SRs are to track for the three separate source registers for a given younger instruction. The target of the long running instruction may be the input for the source register in SR1 and/or SR2 and/or SR3. If the target matches any of the source register then it is set to 1. When the long running instruction finishes, the matched SR bits are set to 0.

The summary bit and wake-up column portion 360 of the issue queue 300 can include vectors for tracking status of source registers used by the instruction. For example, a value of "0" can indicate that the contents of the source register is available or that the source register is written to by an instruction that is being tracked with specificity; and a value of "1" can indicate that the contents of the source register are from one of the instructions in the group being tracked by a summary bit and the contents are not available (e.g., the instruction in the group has not finished execution). In accordance with one or more embodiments of the present invention, an additional bit for each source register (e.g., the maximum number of source registers per instruction, in the example shown herein three) is added to every entry in the issue queue. Each source register bit corresponds to a source register used by the instruction. Registers are assigned to source register positions in the instruction (and thus which source bit corresponds to which source register) by the mapper when an instruction is added to the issue queue. In addition target registers are assigned to target register positions in the instruction by the mapper when the instruction is added to the issue queue. When a new instruction is added to the issue queue, all its source registers are checked against the target of the older instructions in the issue queue to determine if the new instruction is dependent on an older instruction or not. When an older instruction's target matches a source register and the older instruction is not being tracked with specificity (i.e., in the issue queue, the older instruction is more than N/2 distance away from the new instruction), then the source register position of the new instruction is set to indicate that the new instruction must wait for the older instruction to finish execution before it can be issued.

Turning now to FIG. 4, a block diagram of a logical view of a scalable dependency matrix 400 is generally shown according to one or more embodiments of the present invention. The scalable dependency matrix 400 shown in FIG. 4 represents an issue queue that holds N instructions and tracks with specificity a dependency of an instruction on N/2 (the threshold in this example, as drawn, is 4) other instructions. The entries in the scalable dependency matrix 400 are inserted in FIFO order and thus, for example, the instruction in row 5 was received into the issue queue immediately before the instruction in row 6.

In accordance with one or more embodiments of the present invention, the scalable dependency matrix 400 can wrap-around and thus, for example, the instruction in row N−1 was received into the issue queue immediately before the instruction in row 0. When wrap-around of circular queue is utilized head and tail pointers can be used to track oldest and youngest entries, and the summary bit is cleared when the head pointer (oldest entry) advances. As a result, all summary bits that are now closer to the head than the threshold (e.g., 4) are cleared since the head pointer only advances when entries are deallocated, which requires that the corresponding instructions have issued and passed their reject points.

In one or more exemplary embodiments, instead of using a wrap-around matrix, instructions are shifted within the queue toward the top row whenever space is made available to shift upward as queue positions are deallocated. The contents of the matrix can shift up and left an equal amount. In this case, only the open (unshaded) boxes in FIG. 4 are needed, and as the matrix takes on a trapezoidal shape.

As shown in FIG. 4, a dependency between an instruction and the four instructions inserted into the issue queue immediately prior to the instruction are tracked with specificity and individually identified in a first portion, a specificity portion 404, of the dependency matrix 400; while a dependency between the instruction and any of the other instructions in the issue queue is tracked using a summary bit portion 402 of the dependency matrix 400.

The specificity portion 404 of the dependency matrix 400 shown in FIG. 4 can be used, for example, to determine whether the instruction in row 6 is dependent on the instruction in row 5, whether the instruction in row 6 is dependent on the instruction in row 4, whether the instruction in row 6 is dependent on the instruction in row 3, and whether the instruction in row 6 is dependent on the instruction in row 2. If the instruction in row 6 is dependent on the instruction in row 3 and not the instructions in rows 5, 4, and 2 (and the summary bit is not set), then only the instruction in row 3 has to issue before the instruction in row 6 is ready to be issued.

The summary bit portion 402 of the dependency matrix 400 can be used to determine whether the instruction in row 6 is dependent on any of the instructions in rows 0 through 1 and rows 7 through N−1. A single summary bit can represent the dependency of row 6 on any of row 0 through 1 and rows 7 through N−1, and thus if a dependency is identified by the summary bit, all of the instructions in row 1 and rows 7 through N−1 must be issued before the instruction in row 6 can be issued. As described herein, the summary bit or specificity bit is cleared when the corresponding instruction is deallocated.

In accordance with one or more embodiments of the present invention, the summary bit portion 402, or other latch, for the instruction in row 6 is set when the instruction is dependent on any of the instructions in row 0 through 1 and rows 7 through N−1 and reset when all of the instructions in row 1 and rows 7 through N−1 that were present in the issue queue when instruction 6 was dispatched are issued, have passed their respective reject point and been de-allocated. Similarly, a corresponding bit, or other latch, in the specificity portion 404 is set to indicate a dependency of the instruction in row 6 on a specific prior instruction, and reset when the instruction has issued, passed its reject point and the entry has been de-allocated. Once all of the dependencies of the instruction in row 6 are satisfied (e.g., the instructions are issued) the instruction in row 6 is ready to issue once all of the resources that it requires are available.

The summary bit portion 402 shown in FIG. 4 can include a single summary bit that is used to track a dependency between an instruction and any of more than a threshold number of instructions inserted into the issue queue immediately prior to the instruction. In the embodiment of the present invention shown in FIG. 4, the threshold is four and instructions in the issue queue other than the four instructions inserted into the issue queue immediately prior to the instruction are tracked as a single group using a single summary bit. The single group includes all of the instructions in the issue queue besides the instruction and the four instructions (the threshold is four in this example) inserted into the issue queue immediately prior to the instruction. Thus, if the instruction is dependent on one of the instructions in the single group it must wait until all of the instructions in the single group have issued (and passed their reject points) before the dependency is satisfied. The instruction can then issue if all other dependencies have been satisfied. The single summary bit is reset only when all of the instructions in the single group have been issued (and passed their reject points) from the issue queue.

In accordance with one or more embodiments of the present invention, the summary bit portion 402 shown in FIG. 4 includes multiple summary bits that are used to track dependencies between an instruction and any of more than a threshold number of instructions inserted into the issue queue immediately prior to the instruction. In embodiments of the present invention, instructions in the issue queue other than the threshold number of instructions inserted into the issue queue immediately prior to the instruction are tracked as multiple groups using multiple summary bits. Each of the other instructions in the issue queue besides the instruction and the threshold number of instructions inserted into the issue queue immediately prior to the instruction are included in at least one of the groups. Contents of the multiple groups can be mutually exclusive or they can overlap. The use of multiple summary bits for multiple groups can provide finer granularity than the use of a single summary bit for any instructions not tracked with specificity.

A simplified example for ease of description follows, where N=16, the threshold is N/2=8 and an instruction is inserted at row 15 in an issue queue which includes rows 0 through 15. Any dependency of the instruction in row 15 on the eight instructions inserted into the issue queue immediately prior to the instruction in row 15 (that is the instructions in rows 14, 13, 12, 11, 10, 9, 8, and 7) are tracked with specificity. Thus it can be determined exactly which one or more, if any, of the instructions in rows 14, 13, 12, 11, 10, 9, 8, and 7 of the issue queue that the instruction in row 15 is dependent on. Multiple summary bits representing dependencies on instructions in groupings of instructions at rows 0, 1, 2, 3, 4, 5, and 6 can be implemented by exemplary embodiments of the present invention. For example, a first group can include instructions in rows 3, 4, 5, and 6 in the issue queue and a second group can include instructions in rows 0, 1, and 2 in the issue queue. A dependency of the instruction in row 15 on instructions in the first group can be tracked with a first summary bit and the second group tracked with a second summary bit. Alternatively, a first group can include instructions in rows 3, 4, 5 in the issue queue, a second group can include instructions at rows 6 and 2 in the issue queue, and a third group can include instructions at rows 0 and 1 in the issue queue. A dependency of the instruction in row 15 on instructions in the first group can be tracked with a first summary bit, the second group tracked with a second summary bit, and the third group with a third summary bit. In another alternative the groups can overlap, for example with a first group including instructions in rows 0, 1, 2, 3, 4, 5, and 6 in the issue queue and a second group including instructions in rows 0, 1, and 2 in the issue queue.

Also shown in FIG. 4 is a source register portion 406 that stores one bit that indicates a status of each of the source registers used by each entry, or instruction, in the issue queue. The source register portion 406 is populated when an instruction is added to the issue queue based on information such as RTAGs from the mapper (Mapper does the register renaming, that is, mapping from the logical register as used by the programmer or compiler to a physical register as used by the processor. RTAG or "real tag" indicates the entry number in the physical register file). One vector can be used to store both the summary bit portion 402 and source register portion 406. Alternatively, one vector can store the summary bit portion 402 and another vector the source register portion 406. Other configurations can include multiple vectors storing the source register portion 406. Some embodiments may only have summary bits and no source register portions, while some other embodiments may only have source register portions and no summary bits portion.

The foregoing are just examples, as any number of groups of instructions and corresponding summary bits can be implemented by exemplary embodiments of the present invention. In general, the larger the number of groups and summary bits the higher the cost in terms of the number of bits to track and the lower the cost in terms of throughput. Exemplary embodiments of the present invention can be tailored to adjust the granularity based on implementation requirements. The two extremes include a single summary bit that provides the coarsest granularity and a summary bit for every instruction that provides the finest granularity. In addition, an implementation may only have the source register portions and no summary bits.

Figure 5:
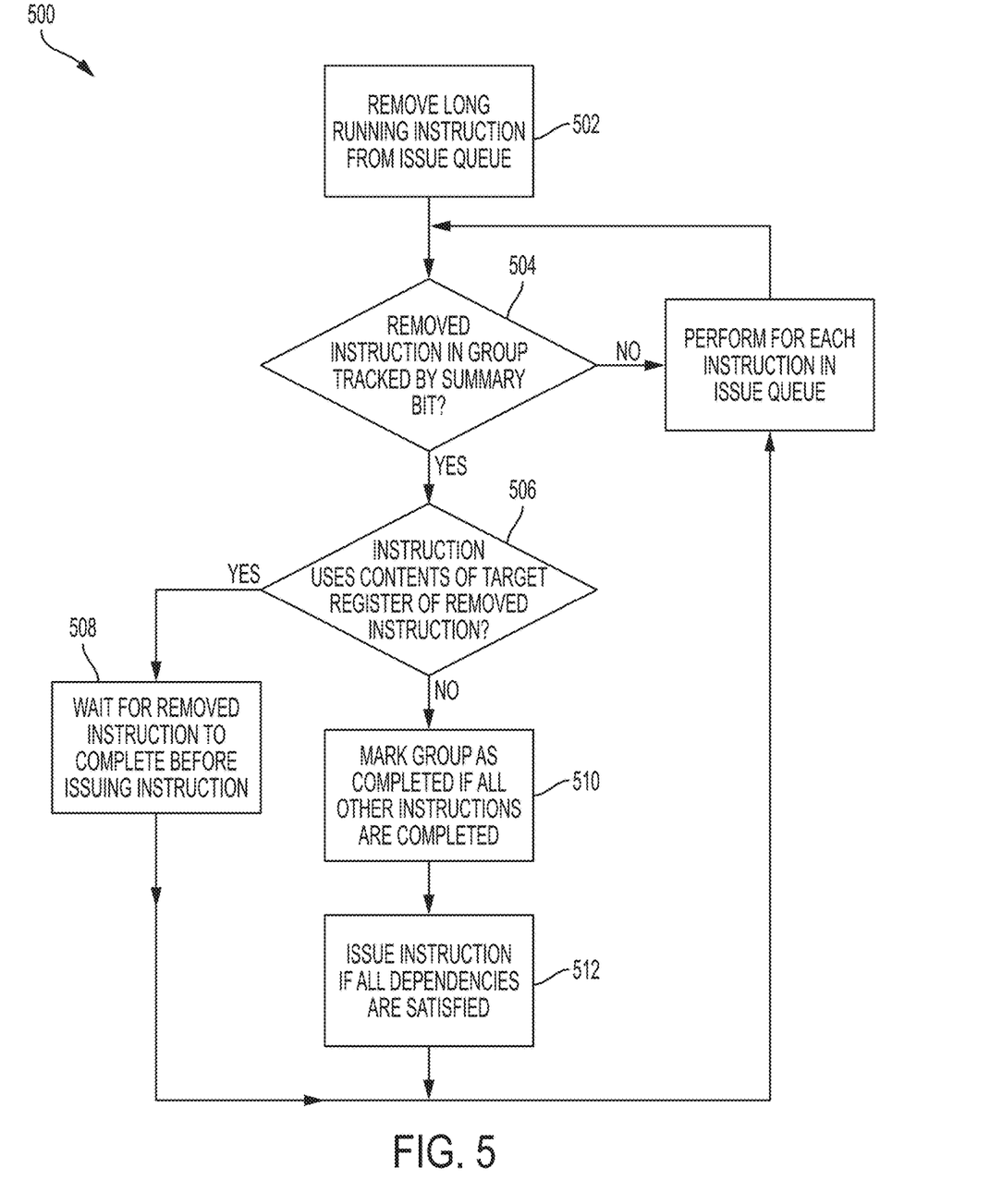
FIG. 5 depicts a flow diagram for implementing a scalable dependency matrix with wake-up columns in accordance with one or more embodiments of the present invention.

Turning now to FIG. 5, a flow diagram 500 for implementing a scalable dependency matrix with wake-up columns is generally shown in accordance with one or more embodiments of the present invention. The processing shown in FIG. 5 can be performed by software and/or hardware located in an issue queue. At block 502, a long running instruction is removed from an issue queue that tracks with specificity, for each instruction, a threshold number of previous instructions for dependencies, and dependencies on the rest of the instructions in the issue queue using a summary bit(s). In addition, the issue queue tracks a status of source registers used by each instruction for source registers that are written to by an instruction in the group being tracked by the summary bit.

Blocks 504 through 512 are repeated for each instruction, or a specified subset of instructions, in the issue queue. At block 504 it is determined whether the instruction removed from the issue queue is in the group of instructions being tracked by the current instruction being processed using a summary bit. If it is not, processing continues at block 504 with the next instruction in the issue queue. If the current instruction is being tracked by the instruction using a summary bit, then processing continues at block 506 where it is determined whether the current instruction uses contents of a target register written to by the removed instruction. This can be determined by comparing the target register of the removed instruction with the source registers of current instruction. If the target register matches a source register of the current instruction and it has a status indicating that the content is not yet available (e.g., "1"), then the current instruction is dependent on the removed instruction finishing execution and processing continues at block 508. At block 508, the process waits for the removed instruction to finish execution before indicating that the current instruction is ready for issuing if all of the other dependencies of the current instruction have also been satisfied. Examples of other dependencies include, but are not limited to dependencies on instructions being tracked with specificity or dependencies on instructions that are in CR or Branch issue queue. In accordance with one or more embodiments of the present invention when the removed instruction finishes execution, a broadcast message is sent to the issue queue to indicate that contents of the target register have been updated by the removed instruction and are ready to be read as a source register by the instruction.

Processing continues at block 510 if it is determined at block 506 that the current instruction does not use contents of a target register written to by the removed instruction. At block 510, if all of the other instructions in the group of instructions being tracked by the summary bit finishes execution, then the summary bit is set to indicate that the group of instructions have finished execution. At block 512 the process indicates that the current instruction is ready for issuing if all of the other dependencies of the current instruction have also been satisfied. At block 512, the current instruction can be issued.

Figure 6:
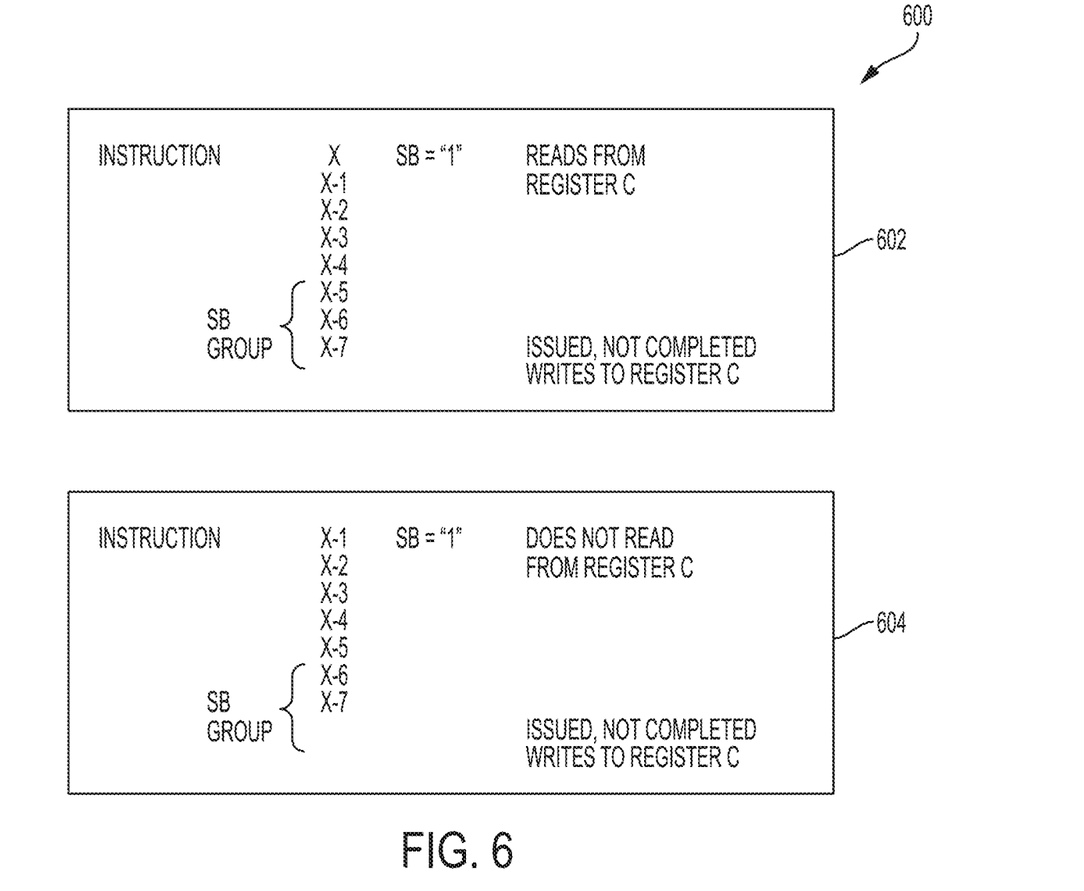
FIG. 6 depicts a block diagram of instructions in an issue queue of an OoO processor in accordance with one or more embodiments of the present invention.

Turning now to FIG. 6, a block diagram 600 of instructions in an issue queue of an OoO processor is generally shown in accordance with one or more embodiments of the present invention. Block 602 shows instruction X which has a summary bit (SB) equal to one which indicates that the instruction is dependent on finishing execution of at least one of the instructions in the group (in this example instructions X-5, X-6, and X-7) being tracked by the SB. Block 602 also shows that instruction X reads from register C as a source register and that instruction X-7 writes to register C as a target register. In addition, block 602 shows that instruction X-7 has issued but has not finished (for example, load has been sent to main memory, but data has not arrived to the target register yet). In the example shown in block 602, the removal of instruction X-7 will result in block 508 of FIG. 5 being performed to wait for X-7 to finish execution and write to register C.

Block 604 shows instruction X-1 which has a summary bit (SB) equal to one which indicates that the instruction is dependent on finishing execution of one or more of the instructions in the group (in this example instructions X-6 and X-7) being tracked by the SB. Block 604 also shows that instruction X-1 does not read from register C as a source register and that instruction X-7 writes to register C as a target register. In addition, block 604 shows that instruction X-7 has issued but has not finished execution. In the example shown in block 604, the removal of instruction X-7 will result in blocks 510-512 of FIG. 5 being performed to indicate that instruction X-1 is ready to issue (e.g., the SB is set to zero) as long as any other dependencies of instruction X-1 are satisfied.

In accordance with one or more embodiments described herein, three source vectors are kept, one for each source operand in an instruction to indicate whether it is dependent on an old issue queue entry. When the blocked entry wakes up (e.g., data from a level three cache miss has come back), the target RTAG of the blocked instruction can be used to compare the source RTAGs of each valid entry in the issue queue. In accordance with one or more embodiments described herein, three separate wake-up column vectors are created, one for each source operand. The source and target RTAGs are available in the issue queue. In accordance with one or more embodiments of the present invention, register type is needed but a thread identifier is not required. The operation can go on continually for example, for the oldest instruction in the issue queue and/or whenever a data from a long latency load instruction comes back.

Figure 7:
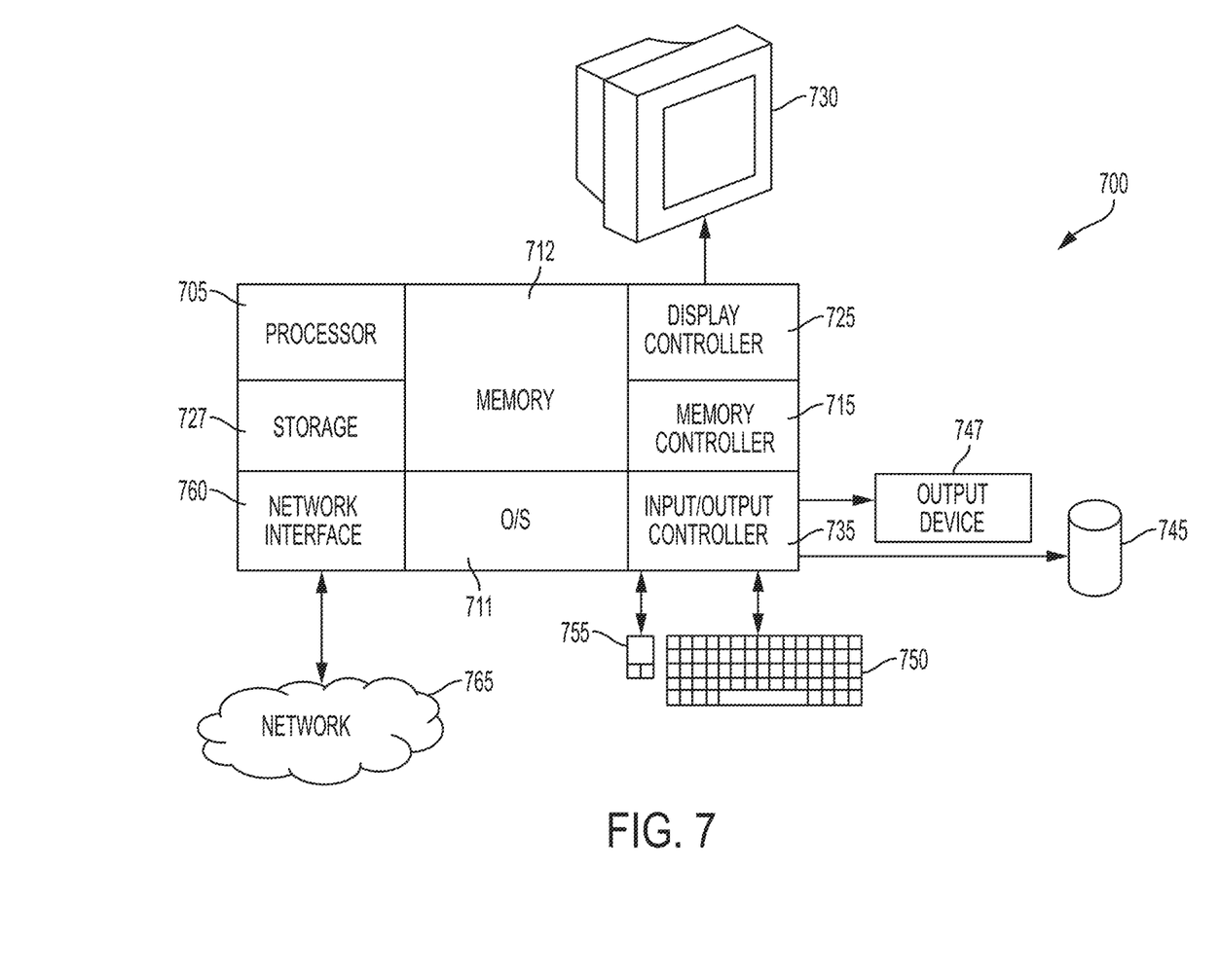
FIG. 7 is a block diagram of a computer system for implementing some or all aspects of a scalable dependency matrix with wake-up columns in accordance with one or more embodiments of the present invention.

Turning now to FIG. 7, a block diagram of a computer system 700 for implementing some or all aspects of a scalable dependency matrix with a wake-up column in an OoO processor is generally shown according to one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 700, such as a mobile device, personal computer, workstation, minicomputer, or mainframe computer.

In an exemplary embodiment, as shown in FIG. 7, the computer system 700 includes a processor 705, memory 712 coupled to a memory controller 715, and one or more input devices 745 and/or output devices 747, such as peripherals, that are communicatively coupled via a local I/O controller 735. These devices 747 and 745 may include, for example, a printer, a scanner, a microphone, and the like. A conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 747, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 712. The processor 705 may be a custom made or commercially available processor, a central processing unit (CPU), an auxiliary processor among several processors associated with the computer system 700, a semiconductor based microprocessor (in the form of a microchip or chip set), a microprocessor, or other device for executing instructions. The processor 705 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 712 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 712 may incorporate electronic, magnetic, optical, or other types of storage media. Note that the memory 712 may have a distributed architecture, where various components are situated remote from one another but may be accessed by the processor 705.

The instructions in memory 712 may include one or more separate programs, each of which comprises an ordered listing of executable instructions for implementing logical functions. In the example of FIG. 7, the instructions in the memory 712 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 727, which may be a storage device such as a hard disk drive or solid state drive. The stored instructions in memory 712 or in storage 727 may include those enabling the processor to execute one or more aspects of the dispatch systems and methods of this disclosure.

The computer system 700 may further include a display controller 725 coupled to a display 730. In an exemplary embodiment, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In an exemplary embodiment, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing a scalable dependency matrix with a wake-up column as described herein can be embodied, in whole or in part, in computer program products or in computer systems 700, such as that illustrated in FIG. 7.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   tracking dependencies between instructions in an issue queue, wherein the tracking comprises, for each instruction in the issue queue:
   tracking a specific dependency on each of a threshold number of instructions most recently added to the issue queue prior to the instruction;
   tracking as a single group, a dependency of the instruction on any instructions in the issue queue that are not in the threshold number of instructions, the tracking via a summary bit in the issue queue;
   tracking, via a wake-up column bit in the issue queue, for each source register used by the instruction, an indicator of whether its content is dependent on results from one or more instructions in the single group that has not finished execution;
   detecting removal from the issue queue of an instruction in the single group, wherein the removed instruction has issued and not finished execution;
   based on the detecting, determining for each of the source registers used by the instruction whether or not its content is dependent on results from the removed instruction and setting a value of the corresponding wake-up column bit based on the determining;
   marking the instruction as ready to issue based at least in part on the value of the wake-up column bits indicating that contents of the source registers are not dependent on results from the removed instruction and on the summary bit indicating that the instruction is not dependent on any instruction in the single group and on the instruction not being dependent on any of the instructions in the issue queue that are within the threshold number of instructions; and
   waiting for a notification that the removed instruction has finished execution before marking the instruction as ready to issue, the waiting based at least in part on the value of the wake-up column bits indicating that contents of at least one of the source registers are dependent on results from the removed instruction.

2. The computer-implemented method of claim 1, further comprising selecting the removed instruction based at least in part on the removed instruction being the oldest instruction in the issue queue.

3. The computer-implemented method of claim 1, further comprising selecting the removed instruction based at least in part on an elapsed amount of time since the removed instruction was issued.

4. The computer-implemented method of claim 1, further comprising selecting the removed instruction based at least in part on a type of the removed instruction.

5. The computer-implemented method of claim 1, further comprising periodically selecting and removing an instruction from the issue queue.

6. The computer-implemented method of claim 1, wherein the issue queue is a first-in-first-out (FIFO) queue and the instructions in the issue queue are ordered based on the order that they were added to the issue queue.

7. The computer-implemented method of claim 1, wherein the instructions in the issue queue are from a single thread being executed by an out-of-order (OoO) processor.

8. The computer-implemented method of claim 1, wherein the instructions in the each of the threshold number of instruction includes all of instructions in the issue queue that correspond to a single thread within a multi-threading environment.

9. A system comprising:
a dependency matrix in an issue queue of an out-of-order processor;
a memory having computer readable instructions; and
one or more processors for executing the computer readable instructions, the computer readable instructions controlling the one or more processors to perform operations comprising:
tracking dependencies between instructions in an issue queue, wherein the tracking comprises, for each instruction in the issue queue:
tracking a specific dependency on each of a threshold number of instructions most recently added to the issue queue prior to the instruction;
tracking as a single group, a dependency of the instruction on any instructions in the issue queue that are not in the threshold number of instructions, the tracking via a summary bit in the issue queue;
tracking, via a wake-up column bit in the issue queue, for each source register used by the instruction, an indicator of whether its content is dependent on results from one or more instructions in the single group that has not finished execution;
detecting removal from the issue queue of an instruction in the single group, wherein the removed instruction has issued and not finished execution;
based on the detecting, determining for each of the source registers used by the instruction whether or not its content is dependent on results from the removed instruction and setting a value of the corresponding wake-up column bit based on the determining;
marking the instruction as ready to issue based at least in part on the value of the wake-up column bits indicating that contents of the source registers are not dependent on results from the removed instruction and on the summary bit indicating that the instruction is not dependent on any instruction in the single group and on the instruction not being dependent on any of the instructions in the issue queue that are within the threshold number of instructions; and
waiting for a notification that the removed instruction has finished execution before marking the instruction as ready to issue, the waiting based at least in part on the value of the wake-up column bits indicating that contents of at least one of the source registers are dependent on results from the removed instruction.

10. The system of claim 9, wherein the operations further comprise selecting the removed instruction based at least in part on the removed instruction being the oldest instruction in the issue queue.

11. The system of claim 9, wherein the operations further comprise selecting the removed instruction based at least in part on an elapsed amount of time since the removed instruction was issued.

12. The system of claim 9, wherein the operations further comprise selecting the removed instruction based at least in part on a type of the removed instruction.

13. The system of claim 9, wherein the operations further comprise periodically selecting and removing an instruction from the issue queue.

14. The system of claim 9, wherein issue queue is a first-in-first-out (FIFO) queue and the instructions in the issue queue are ordered based on the order that they were added to the issue queue.

15. The system of claim 9, wherein the instructions in the issue queue are from a single thread being executed by an out-of-order (OoO) processor.

16. The system of claim 9, wherein the instructions in the each of the threshold number of instruction includes all of instructions in the issue queue that correspond to a single thread within a multi-threading environment.

17. A computer program product comprising a computer readable storage medium having program instructions embodied therewith, the program instructions executable by a processor to cause the processor to perform operations comprising:
tracking dependencies between instructions in an issue queue, wherein the tracking comprises, for each instruction in the issue queue:
tracking a specific dependency on each of a threshold number of instructions most recently added to the issue queue prior to the instruction;
tracking as a single group, a dependency of the instruction on any instructions in the issue queue that are not in the threshold number of instructions, the tracking via a summary bit in the issue queue;
tracking, via a wake-up column bit in the issue queue, for each source register used by the instruction, an indicator of whether its content is dependent on results from one or more instructions in the single group that has not finished execution;
detecting removal from the issue queue of an instruction in the single group, wherein the removed instruction has issued and not finished execution;
based on the detecting, determining for each of the source registers used by the instruction whether or not its content is dependent on results from the removed instruction and setting a value of the corresponding wake-up column bit based on the determining;
marking the instruction as ready to issue based at least in part on the value of the wake-up column bits indicating that contents of the source registers are not dependent on results from the removed instruction and on the summary bit indicating that the instruction is not dependent on any instruction in the single group and on the instruction not being dependent on any of the instructions in the issue queue that are within the threshold number of instructions; and
waiting for a notification that the removed instruction has finished execution before marking the instruction as ready to issue, the waiting based at least in part on the value of the wake-up column bits indicating that contents of at least one of the source registers are dependent on results from the removed instruction.

18. The computer program product of claim 17 wherein the operations further comprise:
selecting the removed instruction based at least in part on at least one of the group consisting of removed instruction being the oldest instruction in the issue queue, an elapsed amount of time since the removed instruction was issued, and a type of the removed instruction; and
periodically selecting and removing an instruction from the issue queue.

* * * * *